Patented June 26, 1934

1,963,955

UNITED STATES PATENT OFFICE 1,963,955

INSECT REPELLENT

Clarence R. Cleveland, Chicago, Ill., assignor to Standard Oil Company, Chicago, Ill., a corporation of Indiana No Drawing. Application January 5, 1932,
Serial No. 584,897

9 Claims. (Cl. 167—30)

This invention relates to improvements in preparations which are adapted to repel insects such as mosquitoes, flies, and the like.

I have found that the aralkyl esters of salicylic acid and the ether derivatives thereof are useful for repelling insects. The compounds suitable for my invention have the following general formula:

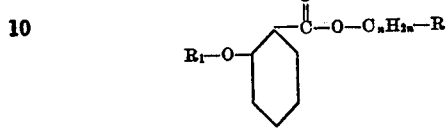

wherein $n$ represents an integer; R represents an aryl radical, hydroaryl radical, or substituent thereof; and $R_1$ represents an alkyl radical.

The salicylates may be incorporated in any suitable vehicle, for example, they may be incorporated in oils, creams, emulsions, or other suitable vehicles. The following example will serve to illustrate a suitable preparation.

Example 1

| | |
|---|---|
| White mineral oil, about 200 seconds Saybolt viscosity at 100° F | 16 oz. |
| White beeswax | 4 oz. |
| Spermacetti | 1 oz. |
| Distilled water | 8 oz. |
| Borax | 30 gr. |
| Benzyl salicylate | 2 oz. |

The above ingredients are thoroughly emulsified to form a cosmetic cream in the manner well known to the art, and the cream may be spread upon the area infested with the insects.

The salicylates may be dissolved in an oil, such as mineral oils or vegetable oils, and sprayed upon the infested area.

Example 2

| | |
|---|---|
| Mineral oil having a viscosity of 80 to 85° Saybolt viscosity at 100° F | 96% |
| Phenethyl salicylate | 4% |

Mineral oils or refined mineral oils having a viscosity from 70 to 90° Saybolt at 100° F. may be used in the above example as suitable vehicles for the salicylates. Suitable non-irritant vegetable and animal oils may also be used as a vehicle for the insectifuges, for example, whale oil, cottonseed oil and the like. Also, mixtures of the salicylates may be dissolved in a suitable vehicle and used, or other insectifuges, such as pyrethrum, may be used in combination with the salicylates.

Example 3

| | |
|---|---|
| Mineral oil 70 to 90° Saybolt viscosity at 100° F., containing the active principles from ¼ to 2 lb. of pyrethrum flowers per gallon | 97% |
| Benzyl salicylate | 3% |

The following compounds are representative of those compounds which may be employed in the above examples: benzyl salicylate, phenethyl salicylate, phenylpropyl salicylate, cinnamyl salicylate, hydrocinnamyl salicylate, methylbenzyl salicylate, hydrobenzyl salicylate, methyl ether of benzyl salicylate, ethyl ether of phenethyl salicylate, ethyl ether of benzyl salicylate, butyl ether of benzyl salicylate, and other ethers boiling within the range of the above compounds may be used.

The proportions of the esters used in the above examples may be varied according to the activity of the particular ester used and the insect to be repelled. The salicylates may be effectively used in concentrations as high as 10% but generally concentrations from 1 to 5% are satisfactory.

This application is a continuation-in-part of my co-pending application No. 377,333, filed July 10, 1929 (Patent 1,911,551 May 30, 1933).

Although I have given specific examples to illustrate my invention, it should be understood that these are not intended as limitations upon the scope of the invention.

I claim:

1. An insect repellent comprising an aralkyl ester of salicylic acid.
2. An insect repellent comprising benzyl salicylate.
3. An insect repellent comprising an alkyl ether of an aralkyl salicylate.
4. An insect repellent comprising phenethyl salicylate.
5. An insect repellent comprising a mineral oil solution of an aralkyl salicylate.
6. An insect repellent comprising a mineral oil solution of benzyl salicylate.
7. An insect repellent comprising a mineral oil solution containing the active principles from pyrethrum flowers, and an aralkyl salicylate.
8. An insect repellent comprising a compound of the general formula

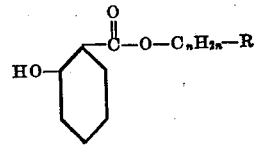

wherein $n$ represents an integer and R represents an aryl radical.
9. An insect repellent comprising a compound of the general formula
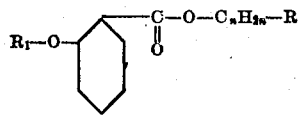
wherein $n$ represents an integer, R represents an aryl radical, hydroaryl radical, or a substituent thereof, and $R_1$ represents an alkyl radical.
CLARENCE R. CLEVELAND.